United States Patent [19]

Crowson et al.

[11] Patent Number: 5,045,700
[45] Date of Patent: Sep. 3, 1991

[54] HEADGEAR-MOUNTED INDICATOR FOR IONIZING RADIATION

[76] Inventors: Robert H. Crowson, 1 Main St., Silver Park, Nev. 89047; Francis R. Crowson, 3844 Mount Airy Dr., Mount Airy, Md. 21771

[21] Appl. No.: 399,232

[22] Filed: Aug. 29, 1989

[51] Int. Cl.$^5$ ............... G01T 1/00; G01T 1/16; G01T 1/18; G01T 1/185
[52] U.S. Cl. ................ 250/336.1; 250/374; 250/388
[58] Field of Search ............ 250/336.1, 374, 388, 250/389, 370.07, 337, 475.2

[56] References Cited

U.S. PATENT DOCUMENTS

| | | | |
|---|---|---|---|
| 2,638,553 | 12/1953 | Landsverk et al. | 250/378 |
| 2,818,511 | 12/1957 | Ullery, Jr. et al. | 250/211 R |
| 2,971,432 | 2/1956 | Blank | 352/171 |
| 3,277,300 | 10/1966 | Kerr et al. | 250/351 |
| 3,283,153 | 11/1966 | Geiger | 250/475.2 |
| 3,581,089 | 5/1971 | Craig | 250/472.1 |
| 3,597,054 | 8/1971 | Winter | 250/474.1 |
| 3,783,292 | 1/1974 | Alter et al. | 250/475.2 |
| 3,984,690 | 10/1976 | Marshall, III et al. | 250/374 |
| 4,197,461 | 4/1980 | Umbarger et al. | 250/370.07 |
| 4,320,393 | 5/1982 | Engdahl | 340/600 |
| 4,550,984 | 11/1985 | Reymound | 350/404 |
| 4,605,858 | 8/1986 | Terhune | 250/374 |
| 4,642,463 | 2/1987 | Thomas | 250/336.1 |
| 4,695,730 | 9/1987 | Noda et al. | 250/370.09 |

FOREIGN PATENT DOCUMENTS 1066433 11/1979 Canada.

OTHER PUBLICATIONS

Van Nostrand's Scientific Encyclopedia (fifth edition), Van Norstrand Reinhold Company, N.Y., p. 2254.
Vakulov et al., "Miniatur Proportional Counters with Thin Mica Windows for Space Experiments", Geomagnetism & Aeronomy, vol. 18, No. 5, 1978, pp. 624–625.
Freidland et al., "A Shallow Diffuse P-n Junction Operated with Reverse Bias Forms a Space-Charged Region that Functions as a Fast Solid-State Ionization Chamber", Nucleonics, 1960, pp. 54–59.

Primary Examiner—Constantine Hannaher
Assistant Examiner—Edward J. Glick
Attorney, Agent, or Firm—Ronald P. Kananen

[57] ABSTRACT

A visual display for indicating a level of ionizing radiation is mounted on a portion of an item of headwear, such as safety goggles, at a position within the peripheral field of vision of a wearer. Such a display advises a wearer of a level of radiation, including warning levels, in real time without requiring activity on the part of the wearer. In one embodiment, an ionizing radiation detector, accompanying circuitry, and the visual display are mounted on the glasses, such as on the frame. In another embodiment, a commercially-available detector is used to provide an output from a location remote from the headwear to actuate the visual display on the headwear. Various circuit embodiments are also disclosed.

14 Claims, 5 Drawing Sheets

HEADGEAR-MOUNTED INDICATOR FOR IONIZING RADIATION

BACKGROUND OF THE INVENTION

This invention relates to an ionizing radiation indicator mounted on an item of headgear as a safety device. More particularly, this invention relates to visual, audible, and tactile indicators incorporated into headgear, such as safety glasses, for dynamically displaying ionizing radiation levels in nearly real time, for use with ionizing radiation detectors which are mounted on the headgear or elsewhere on the body. Still more particularly, this invention relates to the combination of a circuit for detecting ionizing radiation in combination with a plurality of visual indicators mounted in the field of view of safety glasses to alert a wearer in nearly real time of the presence of ionizing radiation and its intensity. Audible, tactile, and infrared devices also coordinate to alert the wearer of unsafe levels of radiation.

Safety in ionizing radiation zones is of paramount importance. Central to safe conduct is the notion of monitoring levels of ionizing radiation and alerting personnel to those levels, especially when the levels become gradually or suddenly unsafe. Thus, a self-reading dosimeter is widely used in the nuclear industry for the immediate self-evaluation of X-ray, gamma ray, and beta radiation exposure to an individual. Such a device has significant shortcomings in that, at best, it is only periodically read by the wearer while in a potential radiation field. Frequently, such a dosimeter is carried at a location on the body of the wearer, or so shielded that the instrumentation does not accurately reflect the whole body exposure or the exposure for the head and vital organs. Many times, the dosimeter becomes contaminated from the gloves of workers and thereby provides an erroneous indication of higher exposure than actually received by the wearer. Moreover, its inherent fragility causes overexposure or fear of overexposure among workers because of some undetected physical blow or show to the instrument.

Representative examples of such instruments for measuring the amount of exposure to radioactivity are found in U.S. Pat. No. 2,638,553 to Landsverk; U.S. Pat. No. 4,320,393 to Engdahl; U.S. Pat. No. 4,695,730 to Noda; and U.S. Pat. No. 2,818,511 to Ullery. Engdahl also suggests that such a device might produce an acoustic or optical alarm when a threshold radiation level is reached. Noda suggests that the detector, which may be finger-mounted, may be separated from the alarm.

Miniaturized or pocket-sized radiation alerting devices intended to be carried on various parts of the body have been available for nearly two decades. These devices are commonly called "chirpers" because of the characteristic audible alerting signal emitted from the device upon exposure to a quantity of ionizing radiation. Frequently, within nuclear power plants, the overall decibel level of sound, or a frequency of sound similar to, or a harmonic of, the "chirp" exists as background sound from the various machines, fluid stream flows, and plant status signals which are endemic to electric power generation. Because of this background cacophony, the "chirper" alert signal is frequently nullified or goes unnoticed. "Chirpers" are therefore of limited use as worker alerting devices. A representative miniaturized radiation chirper is found in U.S. Pat. No. 4,197,461 to Umbarger.

Accordingly, it is a continuing problem in the nuclear arts to provide a person with a continuous awareness of his approximate current exposure to X-ray, gamma ray and beta ionizing radiation and to provide a multi-sensed alarm when an accrued dose in excess of the assigned daily safe exposure limit of the individual to those forms of radiation has been received. Thus, it is desired to visualize directly to a practical extent such otherwise insensible beta, gamma, and X-radiation. Moreover, it is also desired in this art to convert excessively intense radiation fields to audible and tactilely sensible stimuli as well as the visual indication, wherein the visual stimuli are continuously variable in response to the dynamic intensity of the ionizing radiation field or flux.

A hand-held gamma radiation dose meter having a Geiger-Muller (G/M) tube in circuit with a power supply and a pulse counter actuates flashing lights providing a visual display proportional to the counted pulses. However, the flash appears at the unit 13 itself, and not in the field of vision of its wearer. In U.S. Pat. No. 3,581,089, a system for nonvisible radiation detection comprising arrays of photosensitive detectors is suggested for incorporation into goggles or spectacles worn by an observer. However, such a system is not suggested for ionizing radiation, nor does it suggest visual and tactile sensors as herein contemplated. Other examples of headgear-mounted radiation warning devices may be found in U.S. Pat. No. 3,277,300 (infrared detector mounted on a helmet) or U.S. Pat. No. 2,818,511 (infrared and visible sensor mounted on a helmet).

None of these prior art devices has produced a desirable combination of an ionizing radiation sensitive device having a visual indicator in the field of view of the wearer and located in a non-distracting position. None has produced a device of the type described where the visual indicators flash to indicate in real time the current radiation level and none are accompanied in this combination with auxiliary warning devices, such as tactile, audible, and infrared warning devices.

Accordingly, it is a general objective of this invention to provide an item of headwear, such as a face protective or eye protective safety shield, which apparently converts otherwise humanly-insensible ionizing radiation and their dynamically varying intensities into a recognizable, definitive visual sensation.

It is another objective of this invention to provide an item of headgear which includes a plurality of visual indicators within the peripheral field of view of the wearer, and a circuit with an ionizing radiation detector to provide a real-time, continuous visual indication of ionizing radiation level.

It is another objective of this invention to provide an item of safety headgear, such as safety goggles, wherein ionizing radiation detectors, a power supply, amplifiers and interpreters are integrally mounted onto the headwear, such as on the frame or earpieces of safety glasses or goggles.

It is still another objective of this invention to provide an item of safety headgear, such as safety goggles or glasses, wherein ionizing radiation detectors and associated electronics are mounted together in a packet worn elsewhere by the use, and connected with the visual, tactile, and audible display devices on the goggles or glasses.

It is another overall objective of this invention to provide a simultaneous emergency alert through visual, audible, and tactile signals indicating unacceptably high levels of exposure to ionizing radiation.

It is still another overall objective of this invention to miniaturize the components of the system to a size suitable for non-obtrusive positioning on the frame or rims of safety spectacles or goggles which, upon the interaction of one or several of the forms of ionizing radiation with the sensor, produces a finite measurable electric impulse.

It is another overall objective of this invention to provide a visual lighting scheme which cycles repetitively in the view of the user through a circuit featuring a zener diode in circuit with a comparator and a display.

It is another general objective of the invention to locate the visual indicator where the wearer can see the indication without requiring body movement other than eye movement.

It is a further objective of the invention to utilize visible light spectrum-producing devices such as LED's and LCD's or other modulating or controlling devices.

These and other objectives of the invention will become apparent from a written description of the invention which follows taken in conjunction with the accompanying drawings.

BRIEF SUMMARY OF THE INVENTION

Directed to achieving the foregoing objects, the invention in one aspect relates to the combination of an item of headgear, preferably safety goggles, with a detector circuit and a display circuit located on the frame of the goggles, at a location free from the direct field of vision of the wearer, but within the peripheral field of vision. A main feature of the invention is that the wearer may view the display without body movement other than eye movement or other physical intervention. In particular, the detector/display circuit includes an ionizing radiation detector in circuit with a power supply providing an output signal to a buffer and conditioner circuit. The signal buffer and conditioner circuit provide an output to a display interpreter/driver circuit which is in circuit with a display. Preferably, the display is a visual display of a plurality of visible lights arranged to be viewed according to the degree of radiation, or to indicate an alarm condition. In addition to the visual display, the combination of the invention includes tactile and audible display devices for causing a physical and audible sensation to the wearer.

In one circuit embodiment of the invention, a plurality of lights are repetitively actuated according to a ladder of signal intensities, until a predetermined level is reached. When the predetermined level is reached, the lights repetitively cycle in a visible arrow-like fashion to capture the attention of the wearer to the emergency situation.

In an alternate embodiment, the ionizing radiation detector is a commercially available unit which is adapted to be worn on the body of the wearer. The output of the unit is connected to the headpiece, such as the goggles or safety glasses as described, and the displays are provided accordingly.

These and other features of the invention will become further apparent from a review of the specification taken in conjunction with the accompanying drawings.

DETAILED DESCRIPTION OF THE PREFERRED EMBODIMENTS

Figure 1:
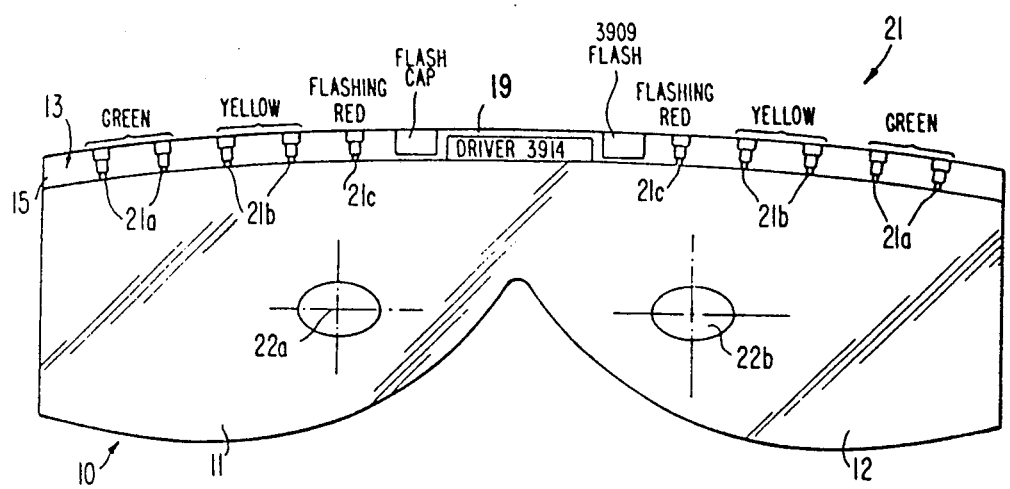
FIG. 1 is an illustrative front view of safety goggles incorporating the display and circuit according to the invention in the upper frame thereof wherein the visual display is outside of the direct field of vision of the wearer.
Figure 2:
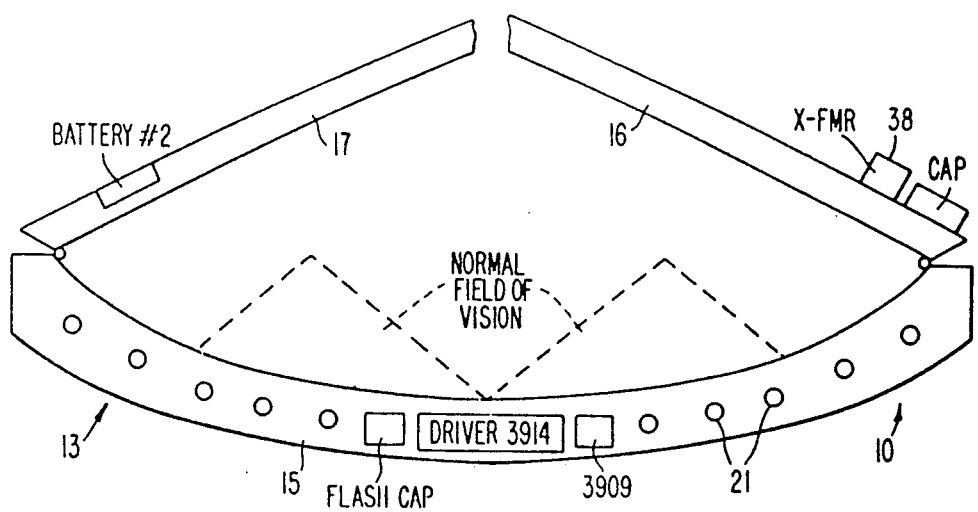
FIG. 2 is a top view similar to FIG. 1, showing circuit elements optionally located in the earpiece of the goggles.
Figure 3:
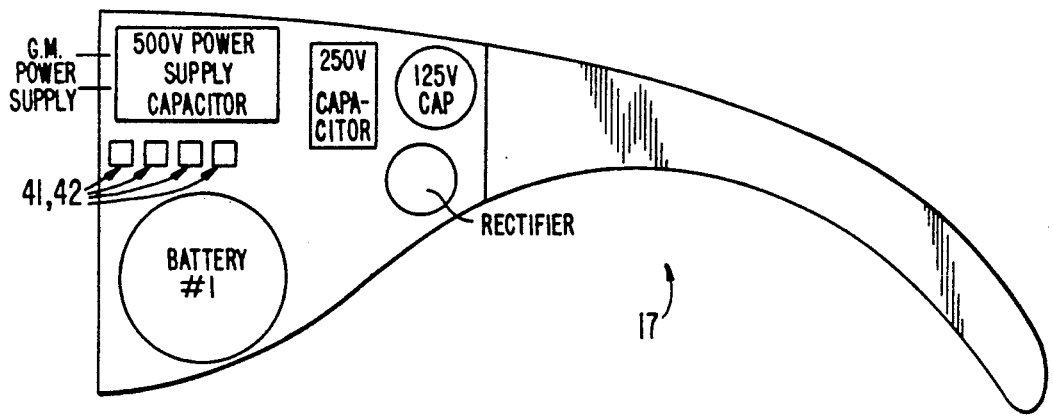
FIG. 3 is a plan view of a right earpiece illustrating circuit elements located therein.
Figure 4:
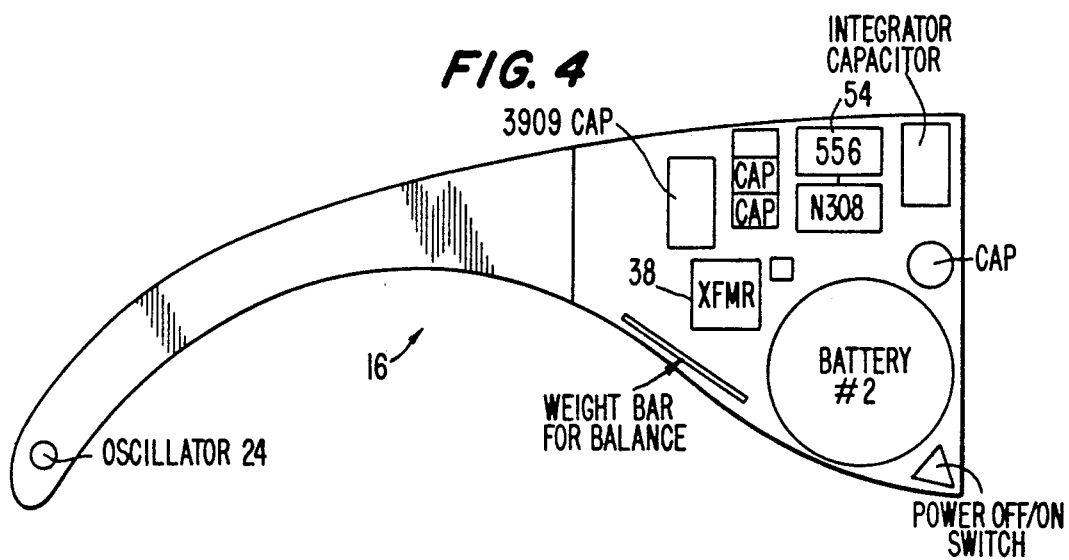
FIG. 4 is a plan view of a left earpiece, similar to FIG. 3, illustrating additional circuit elements located therein.

Referring first to FIGS. 1–4 collectively, the invention is representatively applied to a pair of safety goggles designated generally by the reference numeral 10. The goggles 10 include, as is usual, a pair of lenses 11, 12 supported by a suitable lens holder 13 such as a frame. The frame 13 includes a bridge member 15 having its outer end respectively connected to a left earpiece 16 and a right earpiece 17 The goggles shown are representative and may take a variety of forms, such as safety spectacles, safety goggles, or other items of headgear having a visualizing area at or near the peripheral field of vision of the wearer.

A circuit, designated generally by the reference numeral 19, has its components which will be discussed in greater detail, located in or on the frame 13 of the safety goggles. Thus, the goggles 10 include all of the components necessary to apprise the wearer of the safe or unsafe level of ionizing radiation in his vicinity, on a real time basis.

The goggles 10 include a plurality of visual indicators, such as lights generally designated by the reference numeral 21. The lights 21 may be arranged with plural green lights 21a to designate a safe level of ionizing radiation, plural yellow lights 21b to designate a cautionary level of ionizing radiation, and at least one or more red lights 21c to indicate an alarming level of ionizing radiation. The circuit may drive the lights in a steplike fashion wherein transition from green lights 21a to yellow lights 21b indicates a rising level of ionizing radiation nearly in real time. Alternatively, or conjunctively, the lights may be caused to blink on a periodic or a repetitive basis. It is a feature of the invention that the lights 21 are located outside of the main field of vision of the wearer who normally would focus at the normal pupillary positions 22a, 22b. By so locating the lights, the vision of the wearer is not interrupted from normal working requirements, but the presence of the light at the browline of the wearer will capture attention of the wearer.

Figure 5:
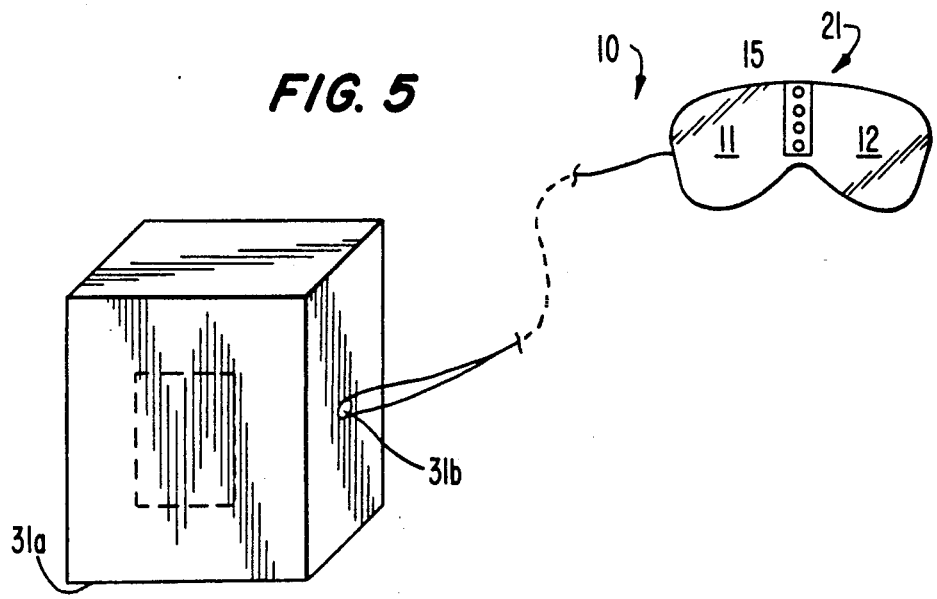
FIG. 5 is an illustrative view of the visual, tactile, and audible displays located on the bridge of safety glasses, wherein the displays are in circuit with a conventional ionizing radiation detector worn on the person of the wearer at another location.

In an alternative, the lights may be located on the bridge 21 of the goggles 10, depending on the physical structure, in a vertically aligned fashion, in a space separating the lenses 11 and 12, as seen in FIG. 5. In either location, it may be advantageous to provide the lights on a separate holder which may be inserted into openings of the lenses of the goggles, so that the lights and the circuitry, if desired, may be replaced as a unit. The particular details of attachment are within the skill in the art.

FIGS. 1-4 collectively illustrate that the components of the circuit 19 may be located at various positions on the lens holder 13. A suitable circuit is shown in block form in FIG. 6 and in detail in FIGS. 7 and 8. Thus, discussion of the circuit components and their operation will be appropriate when discussing those later figures.

Another significant feature of the invention is the use of a tactile stimulator, such as an oscillator 24, to provide a tactile signal to the wearer under predetermined conditions, such as conditions coextensive with those prompting excitation of a red light 21c. The oscillator 24, or another oscillator (not shown), may also be used to provide an audible signal to the wearer. Thus, a feature of the invention is that a state of sensing an unacceptable level of ionizing radiation will prompt visual, tactile, and audible signals, or any suitable combination of such signals desired. In addition, an infrared signal generator could be used as the tactile signal generator to generate a heat signal to the wearer such as at the bridge of his nose to indicate a condition equivalent to the "red light" level of ionizing radiation.

Each of the foregoing signals is provided as state indications to the wearer without the intervention of the wearer, or requiring the wearer to take any positive move, such as looking at a badge on the chest of the wearer, or removing a contamination indicator from his person to view. This is an important feature of the invention.

Figure 6:
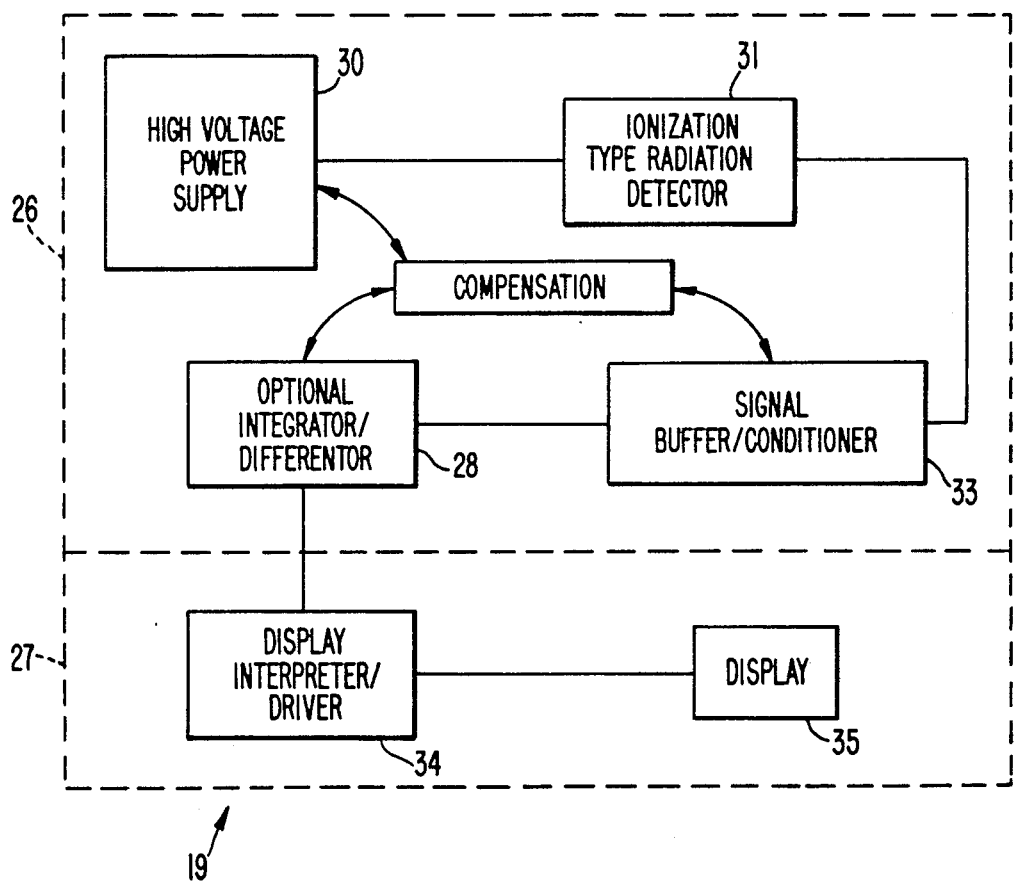
FIG. 6 is a block diagram of a circuit according to the invention for use with the embodiments of FIGS. 1–4, a portion of which can be used for the embodiment of FIG. 5.
Figure 7:
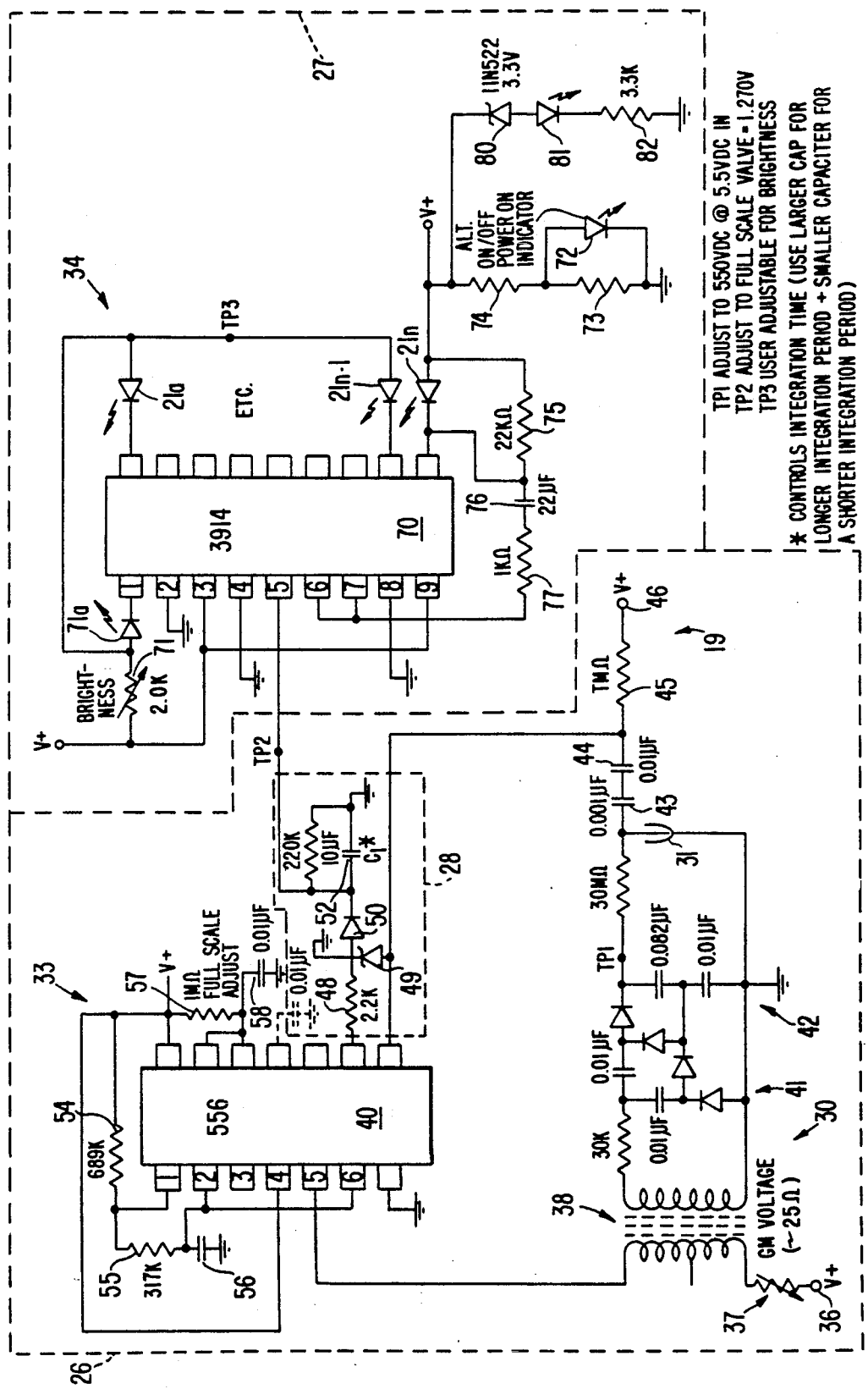
FIG. 7 is a simplified schematic diagram of a circuit corresponding to FIG. 6.
Figure 8:
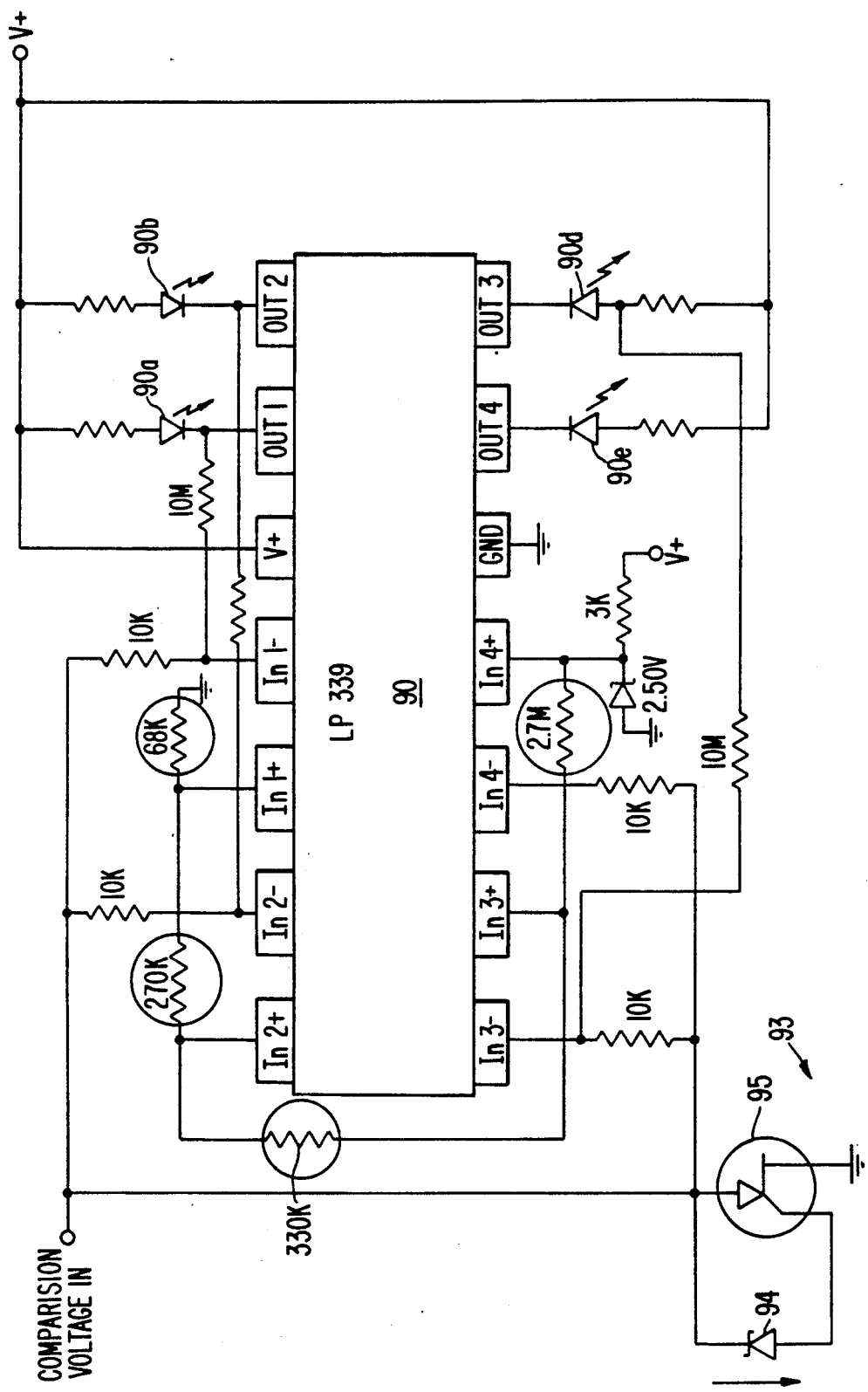
FIG. 8 is alternative circuit utilizing a zener diode/SCR pair for causing a comparator circuit to output a repetitively cycling visual display for warning level radiation detection.

FIG. 5 indicates a simplified alternative to the invention in which the visual displays are provided as indicated in connection with FIGS. 1-4, and the display interpreter/driver circuits of FIGS. 6-8 are used with a commercially available ionization type radiation detector 31a. A suitable unit is available from Victoreen under the brand name PRIMA IIb. The unit includes a GM tube with associated circuitry in a casing on the order of 3.6 in. ×2.5 in.×0.84 in. suitable for being pocket held or worn on a belt. The unit includes a chirper, selectable between 60 and 2 chirps/min. Such a unit is readily modified to provide a jack outlet 31b for the output signal to provide an digital or analog input to the circuits of FIGS. 6-8 mounted on glasses as in FIGS. 1-4.

A block diagram of the circuit 19 as shown in FIG. 6 includes a high voltage power supply 30, available for example from a battery-powered high voltage transformer 38, to bias an ionization-type radiation detector 31, such as a GM tube which is preferably miniaturized. As is well known, such a tube outputs a signal representative of the level of ionization type radiation. The output from the tube 31 is provided as the input to a signal buffer and conditioner circuit 33 having its output connected to a display interpreter/driver circuit 34 to drive the display 35. The display 35 includes the visual indicators 21, as well as the tactile and audible indicators 24 shown in FIGS. 1-4. An integrator/differentiator circuit 28 is optional to receive the output of the signal buffer/conditioner circuit 33. Such a unit, for example, may integrate the GM tube output to sense a cumulative count of output pulses, or a cumulative radiation dose indication. The differentiator option may include a count rate indicator, or an indication of the rate of change of the pulse rate count to indicate a shift in field flux.

When the unit shown in FIG. 5 is used with the block diagram of FIG. 6, the power supply 30 and the detector 31 can be eliminated inasmuch as those functions are found in the commercially-available unit. Thus, the output from the unit is connected to the input of the buffer/conditioner circuit 33.

FIG. 7 illustrates a schematic of circuits 26 and 27 suitable for operating the invention. Reference numerals used in the description of FIGS. 1-6 are also consistently used in FIGS. 7 and 8. The high voltage power supply 30 includes a source of power, such as a battery 36 in series with a variable resistor 37 to the primary of a step-up transformer 38. The other leg of the primary is connected to a pin on the 556 dual timer 40 forming the heart of the oscillator circuit 33. The timer 40 acts as an oscillator for driving the high voltage transformer 38 to transform the oscillator output of 0 to 5 V. to an output on the secondary of the transformer 38 of 150 V. The output from the transformer 38 is provided to a voltage quadrupler 41, 42 to provide a potential voltage of 600 V. at the terminal TP1 for driving the GM tube 31. By way of example, the tube 31 is a miniature GM tube available from TGM under the designation 115-1.

The output from the GM tube 31 is provided through a pair of capacitors 43, 44 in series with a pull up resistor 45 connected to a source of potential 46. The signal at the junction between the capacitor 44 and the resistor 45 provides a trigger input to the dual timer 556. The output analog signal is provided through a current limiting resistor 48 connected to a stabilizing zener diode 49 and integrating the output of the monostable timer 57, 58 through a current checking diode 50 across a capacitor 52. The output from the diode 50 provides the input to the interpreter/driver circuit 34 formed from a LM3914 integrated circuit. The cathode of the diode 50 is also connected to a parallel circuit consisting of a resistor 51 and capacitor 52 connected to ground.

Thus, the pin 7 on the astable oscillator side of the 556 element 40 is connected to ground; the pins 2 and 6 are connected to the junction between the capacitor 56 and the resistor 55; and the pin 1 is connected to the junction between the resistors 54 and 55, while the pin 4 is connected to the source of positive potential to create an astable oscillator. On the other side of the dual timer 556, the pin 1 is connected to the positive potential source and to pins 2 and 3 through a variable resistor 57 connected to ground through a capacitor 58 to create a monostable oscillator.

The comparator 70 forms the heart of the display interpreter/driver circuit 34 and receives the analog output signal representative of the GM tube 31 as its input. A plurality of LED's acting as visual indicators 21 are respectively connected to the output of the comparator element 34. A variable resistor 71 is connected to an indicator 71a for controlling brightness of the LED's 21. The comparator circuit 70 also includes an on/off power indicator 72 connected to ground, in parallel with a resistor 73 in series with a resistor 74 to a source of positive potential. The source of positive potential is also in circuit with pins 6 and 7 through resistor 75, capacitor 76 and resistor 77. A zener diode 80 is in series with an LED 81 and a resistor 82.

With the circuit arrangement as shown, the lamps 21a, 21b, and 21c are sequentially actuated to change from green to yellow to red as the ionization radiation increases, as described above. With this circuit, the threshold potentials for the lights 21 are easily adjusted.

The circuit of FIG. 8 uses an LP 339 circuit element as the basic comparator to sequentially fire the LED's 90a, 90b, 90c and 90d as shown. In principle the operation of the circuit 90 is like that of the circuit 34 in FIG. 7 wherein the input resistors to the circuit 90 determine the firing potential. By using an input circuit 93 having a zener diode 94 for controlling the firing of an SCR 95 to ground the input, the circuit will cause the LED's 90a to 90d to fire repetitively and cyclically in a ramp fashion. Thus, when the zener voltage approximates the voltage indicating a radiation danger signal, the lights will flash repetitively in sequence to alert the wearer of the radiation level.

Returning to the practical embodiment of FIGS. 1-4, it can be seen that the circuit elements for the circuit shown in FIG. 6 are easily included on the lens holder, as previously noted.

It should be understood that the particular sequence of ignition of the visual display elements, their precise position on the headwear, or the particular item of headwear can be altered within the spirit of this invention. Thus, there are many alternative forms of construction for the invention. The foregoing embodiments are thus to be considered as the preferred embodiments of the invention and it will be clear to those skilled in the art that the various changes and modifications may be made therein without departing from the invention. It is therefore intended that the appended claims cover such changes and modification as may fall within the spirit and scope of the invention.

What is claimed is:

1. A combination comprising:
   headwear means structurally adapted for being worn on or at about the head of a wearer;
   a high energy ionizing radiation detector for providing a signal representative of the level of ionizing radiation in a vicinity;
   circuit means for receiving said signal and providing a display driver signal representative thereof; and
   display means, including a visual indicator located on said headwear means at a location at least peripherally visible to the wearer, for displaying in nearly real time a visual signal representative of the level of ionizing radiation in said vicinity where the bearer cannot avoid and can view the visual indication without body movement other than eye movement, or physical intervention.

2. The combination as set forth in claim 1 wherein said headwear means is a pair of safety goggles having a lens and a lens holder, said display means being mounted on said lens holder at a location relative to said lens to be seen in the peripheral field of vision of a wearer of said safety goggles.

3. The combination as set forth in claim 2 further including a tactile stimulator which is actuated when said level of ionizing radiation reaches a predetermined level, said tactile simulator when actuated providing a tactile sensation to a wearer of said safety goggles when actuated.

4. The combination as set forth in claim 3 further including an audible signal generator which is actuated when said level of ionizing radiation reads a predetermined level, said audible signal generator being located on said safety goggles.

5. The combination as set forth in claim 2 wherein said lens holder includes a portion extending generally horizontally above the normal field of vision of the wearer, said display means being mounted on said portion.

6. The combination as set forth in claim 2 wherein said lens holder includes a portion located intermediate a pair of lenses, display means being mounted on said intermediate portion.

7. The combination as set forth in claim 1 wherein said ionizing radiation detector, said circuit means, and said display means are located on a portion of said headwear means.

8. The combination as set forth in claim 1 wherein said ionizing radiation detector and said circuit means are contained in a unit located remote from said headwear means, said display means being located on a portion of said headwear means.

9. The combination as set forth in claim 1 wherein said visual display means includes a plurality of lights, said circuit means exciting selected ones of said lights in a predetermined pattern to indicate various levels of said ionizing radiation.

10. The combination as set forth in claim 9 wherein said circuit means includes a plurality of said lights and a comparator for exciting selected ones of said plurality of said lights in a sequence depending upon the level of said ionizing radiation, said circuit means including a bypass circuit means for causing said sequence of exciting selected ones of said lights to cycle repetitively.

11. The combination as set forth in claim 10 wherein said circuit means includes a zener diode connected to an input of said comparator and to an output of said ionizing radiation detector and to a gate of an SCR, an anode to cathode path of said SCR being connected between said input of said comparator and a source of reference potential.

12. An ionizing radiation detecting device, comprising:
   a high energy ionizing radiation detector structurally adapted to be worn on a person, producing a signal representative of a level of ionizing radiation in the vicinity of said detector;
   display means for displaying in nearly real time a visual indication of said signal representative of the level of ionizing radiation in a vicinity of a wearer of said detector; and
   means structurally adapted to be worn by said wearer and cooperating with said display means, for displaying said visual indication of the level of ionizing radiation at a nondistracting location outside of the normal field of vision of the wearer and within the peripheral field of vision of said wearer where the bearer cannot avoid and can view the visual indication without body movement other than eye movement, or physical intervention.

13. The device of claim 12 wherein said displaying means is an item of headwear for the wearer.

14. The device of claim 13 wherein said visual indication includes a plurality of indicators which indicate the level of the intensity of said ionizing radiation.

* * * * *